H. FISH.
TOOL HOLDER.
APPLICATION FILED JULY 20, 1911.
1,062,448.
Patented May 20, 1913.
2 SHEETS—SHEET 2.
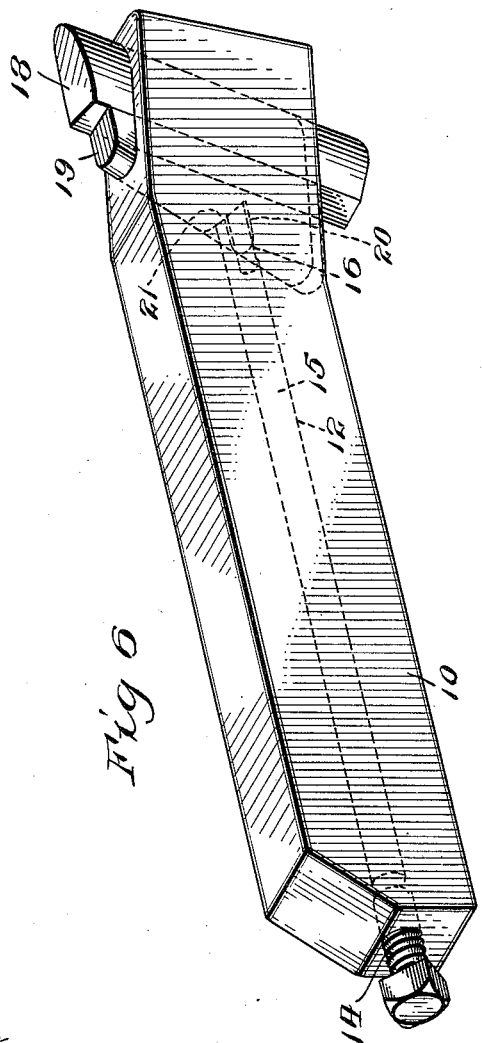
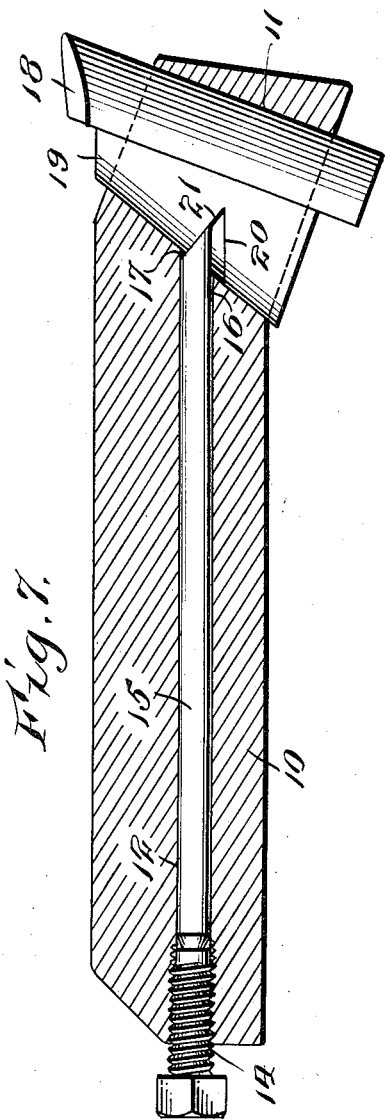
Witnesses:
Inventor
H. Fish
By
Attorneys

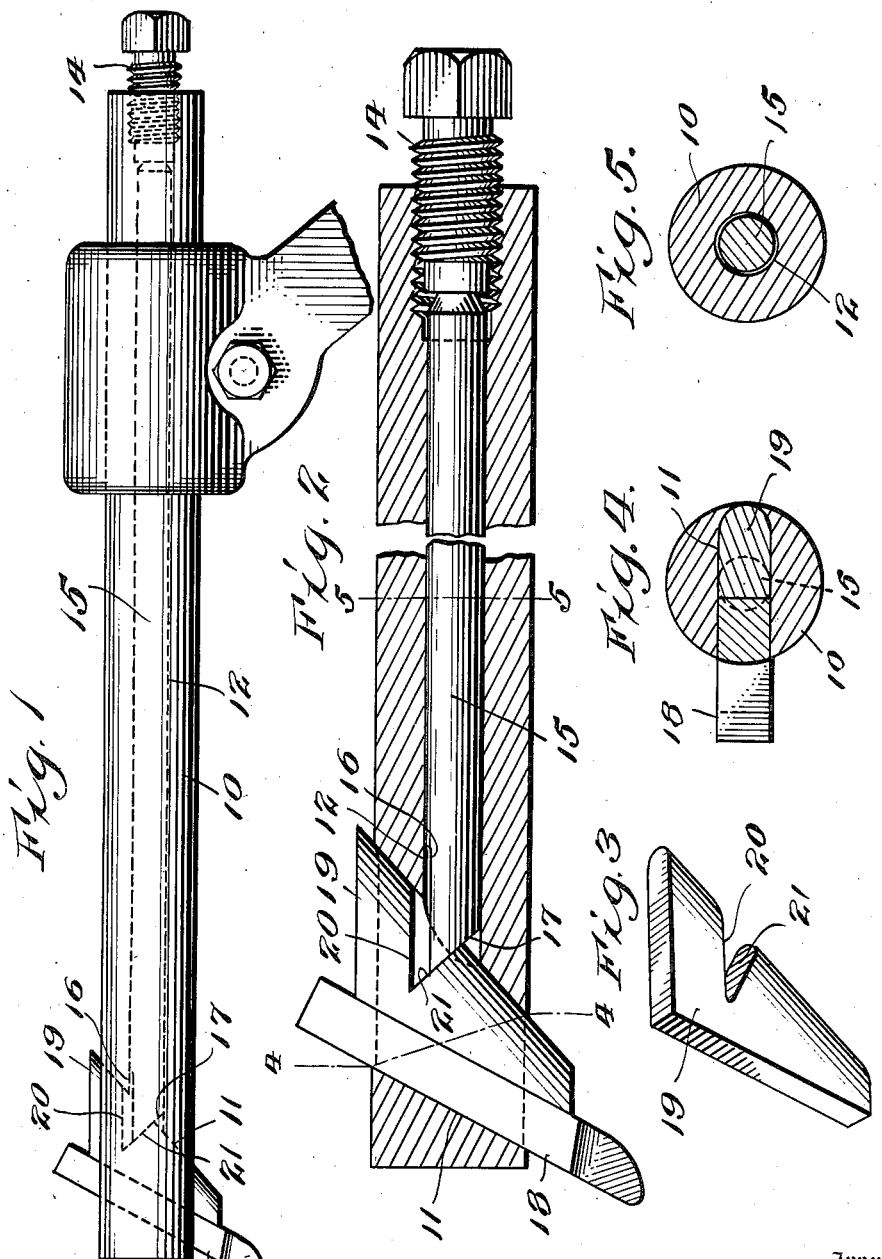

UNITED STATES PATENT OFFICE.

HAROLD FISH, OF STRATFORD, CONNECTICUT, ASSIGNOR TO THE READY TOOL COMPANY, OF BRIDGEPORT, CONNECTICUT, A CORPORATION OF CONNECTICUT.

TOOL-HOLDER.

1,062,448. Specification of Letters Patent. Patented May 20, 1913.

Application filed July 20, 1911. Serial No. 639,647.

*To all whom it may concern:*

Be it known that I, HAROLD FISH, a citizen of the United States, residing at Stratford, in the county of Fairfield and State of Connecticut, have invented certain new and useful Improvements in Tool-Holders; and I do hereby declare the following to be a full, clear, and exact description of the invention, such as will enable others skilled in the art to which it appertains to make and use the same.

This invention relates to tools and more particularly to boring bars and lathe tools in which a removable cutting tool is held in a holder which is intended to be fastened in a tool post or chuck of a lathe or the like.

An object of this invention is to provide a device such as a holder having a transverse and diagonal slot therethrough which slot is adapted to receive a cutting tool and a single wedge to jam the tool within the slot and a medium of controlling the movement of the wedge.

Another object is to provide a holder with a diagonal aperture through the same near the end, said aperture flaring from one side to the other and adapted to receive the cutting tool and a wedge adapted to bear against the cutting tool on the opposite side of the aperture, and a second bar extending through the holder controlled by an adjusting screw in the opposite end of the bar.

Further objects will be apparent from the following specification, appended claims and drawings in which:

Figure 1 is a plan view of the device. Fig. 2 is a longitudinal sectional view of the device. Fig. 3 is a perspective view of the wedge. Figs. 4 and 5 are cross sectional views as on the lines 4—4 and 5—5 respectively of Fig. 2. Fig. 6 is a perspective view of a tool holder equipped with my invention. Fig. 7 is a sectional view through the holder longitudinally.

In using a tool of this class it is frequently necessary to remove the cutting tool to grind the same and as the holder is rigidly held in a tool post it is necessary that some provision be made whereby the cutting tool may be easily removed from the bar without the necessity of releasing cumbersome gripping means which would cause the holder to move from its fixed position and with the above objects in view I provide a bar 10 being similar in appearance to the usual boring bar or lathe tool and through the bar adjacent to one end I cut the diagonal and tapering slot 11, and I also provide a longitudinal bore 12 communicating from said slot through the opposite end of the bar. The end of the bore 12 opposite to the transverse slot 11 is slightly enlarged and internally threaded and adapted to operate in said threaded opening is an adjusting screw 14 which is adapted to bear upon one end of a rod 15 which is inserted in the bore 12. The end of the rod 15 opposite to that which bears against the adjusting screw is cut away as at 16 on one side adjacent the end, and the opposite side is beveled as shown at 17.

A cutting tool of the usual design, as shown in the drawings at 18, is passed through the slot 11 and is adapted to bear against the wall of the slot nearest the end of the bar and arranged to bear against the free wall of the tool and the opposite wall of the transverse slot is a wedge 19 having the edge adapted to bear against the wall of the slot rounded to conform with the wall of the slot, and said edge is notched as shown at 20 to provide a cam surface 21 against which the beveled end of the rod 15 bears.

The operation of the device is as follows:—In a boring bar the cutting tool and wedge are inserted through the transverse slot in the end of the boring bar and the rod 15 is then inserted in the bore within the boring bar and then the adjusting screw is manipulated so as to advance the bar 15 which bears against the cam face of the wedge which in turn jams the wedge between one wall of the transverse slot and the tool, thereby securing the tool in the bar. It is obvious that by releasing the screw in the bar the wedge which jams the tool in the bar may be moved as to release the tool when it can be taken from the tool to be reground.

I claim:—

1. A tool holder comprising a bar, having a transverse flaring bore therethrough adjacent one end thereof a longitudinal bore therethrough from the opposite end to said transverse bore, a wedge block in said transverse bore occupying but a portion of said bore, a tool in said bore between said wedge block and the end of said bore adjacent the near end of the holder, a cam face formed in the edge of said wedge block opposite from the tool engaging face, said cam face being formed intermediate of the ends so as to permit the wedge block to have bearing surface at each side thereof, a bar carried by said holder in the longitudinal bore adapted to engage said wedge block to control its movement in one direction and means to move said longitudinally movable bar.

2. A tool holder comprising a bar having a flaring transverse bore adjacent one end thereof, a longitudinal bore communicating with said transverse bore, a wedge block in said transverse bore adapted to engage a tool with one edge and the end wall of bore with its opposite edge, the edge adapted to engage the bore being rounded, said wedge block having a recess formed in the rounded edge intermediate of its length so as to produce bearing surfaces at each side thereof, said recess having a cam face substantially perpendicular to the general line of the rounded edge of said wedge block, a longitudinally slidable bar in said longitudinal bore having a bevel face formed on one end thereof corresponding to the cam face of the wedge block, the end of said bar having the general configuration of said recess in said wedge block, and a set screw carried by said holder adapted to control the longitudinal movement of said bar in one direction.

In testimony whereof I affix my signature in presence of two witnesses.

HAROLD FISH.

Witnesses:
O. A. RAVEN,
HUGO MOCK.